US012457504B2

United States Patent
Vivanco

(10) Patent No.: US 12,457,504 B2
(45) Date of Patent: Oct. 28, 2025

(54) SYSTEM INFORMATION DELIVERY VIA BEAM SWEEPING IN ADVANCED NETWORKS

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 527 days.

(21) Appl. No.: 17/932,054

(22) Filed: Sep. 14, 2022

(65) Prior Publication Data
US 2024/0089745 A1    Mar. 14, 2024

(51) Int. Cl.
*H04W 16/28*    (2009.01)
(52) U.S. Cl.
CPC .................................. *H04W 16/28* (2013.01)
(58) Field of Classification Search
None
See application file for complete search history.

(56) References Cited

U.S. PATENT DOCUMENTS

| | | | |
|---|---|---|---|
| 2020/0107309 A1* | 4/2020 | Akoum | H04W 72/046 |
| 2021/0185739 A1* | 6/2021 | Prabhakar | H04W 76/30 |
| 2022/0070688 A1* | 3/2022 | Ökvist | H04B 7/0617 |
| 2022/0117004 A1* | 4/2022 | Lee | H04W 72/044 |

OTHER PUBLICATIONS

Wei-Yu Yang et al., 5G On-Demand SI Acquisition Framework and Performance Evaluation, vol. 7, 2019 (Year: 2019).*

* cited by examiner

*Primary Examiner* — Derrick V Rose
(74) *Attorney, Agent, or Firm* — Guntin & Gust, PLC; Erik Boyd

(57) ABSTRACT

The disclosed technology is directed towards user equipment requests for delivery of other system information block (SIB) data from a base station, in which one or more beams for transmitting the other SIB data can be specified by the user equipment based on its state data. Transmitting via only selected beams saves network resources, generally without increasing user equipment retry requests. The user equipment can determine which beam(s) it detects based on beam signal strength data, and determine mobility data of the user equipment. The user equipment determines beam sweeping delivery data based on the detected beam signal strength data and/or the mobility data, and associates the beam sweeping request data with the request for the other SIB data. The network selects one or more beams for sweeping to deliver the other SIB data based on the beam sweeping request data of the user equipment, and possibly other user equipment.

20 Claims, 10 Drawing Sheets

SYSTEM INFORMATION DELIVERY VIA BEAM SWEEPING IN ADVANCED NETWORKS

TECHNICAL FIELD

The subject application relates to the delivery of system information to user equipment via advanced networks, e.g., fifth generation networks and beyond.

BACKGROUND

System information (SI) for user equipment is classified into a master information block (MIB) and system information blocks (SIBs). The master information block includes fundamental information needed by user equipment to begin to communicate, including system frame number and system bandwidth data, and is periodically broadcast on the physical broadcast channel (PBCH). System information blocks contain scheduling and cell access information, and are broadcast on the physical downlink shared channel (PDSCH).

In new radio, including fifth generation (5G) networks, the master information block and system information block type1 (SIB1) are defined as minimum system information (SI), while the other system information blocks (SIB2, SIB3, and so on) are defined as other SI. The minimum SI contains the basic information for acquiring the other SI blocks and processing initial access, and is broadcast periodically in a system information window by the base station (a gNodeB (gNB) in 5G). Unlike minimum SI delivery, the other SI contains additional information that can be delivered on demand when needed, referred to in 5G new radio as on-demand SI delivery.

With respect to other SI delivery, network operators configure each base station to either broadcast the other SIB(s) or send them in response to a request from each user equipment. This is indicated to the user equipment via a si-BroadcastStatus data element in the SIB1 message, set as either si-BroadcastStatus='broadcasting' or si-BroadcastStatus='notbroadcasting'. If not broadcasting the other SI, a user equipment proceeds with a random access procedure to acquire the other SIB(s), including requesting the other SI, and monitoring the next SI window to receive the other SIB(s), which can be a broadcast or unicast communication.

A gNB can configure several beams to improve signal-to-noise ratios (SNR) and increase signal coverage to its served user equipment. A given user equipment camped into this gNB will be in the coverage area of at least of the beams. Such a user equipment thus may send a system information request for the other SI block data to the gNB through one of the beams; (this should be a beam that the user equipment perceives as the strongest one). The gNB responds to the request with the other SI block data. However, returning the other SI block data by sweeping transmission through all available/configured beams is often inefficient, while simply returning the system information via the same beam on which the request was received is unreliable, such as when the user equipment has moved to another coverage area of a different beam before the requested other SI block data can be delivered.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
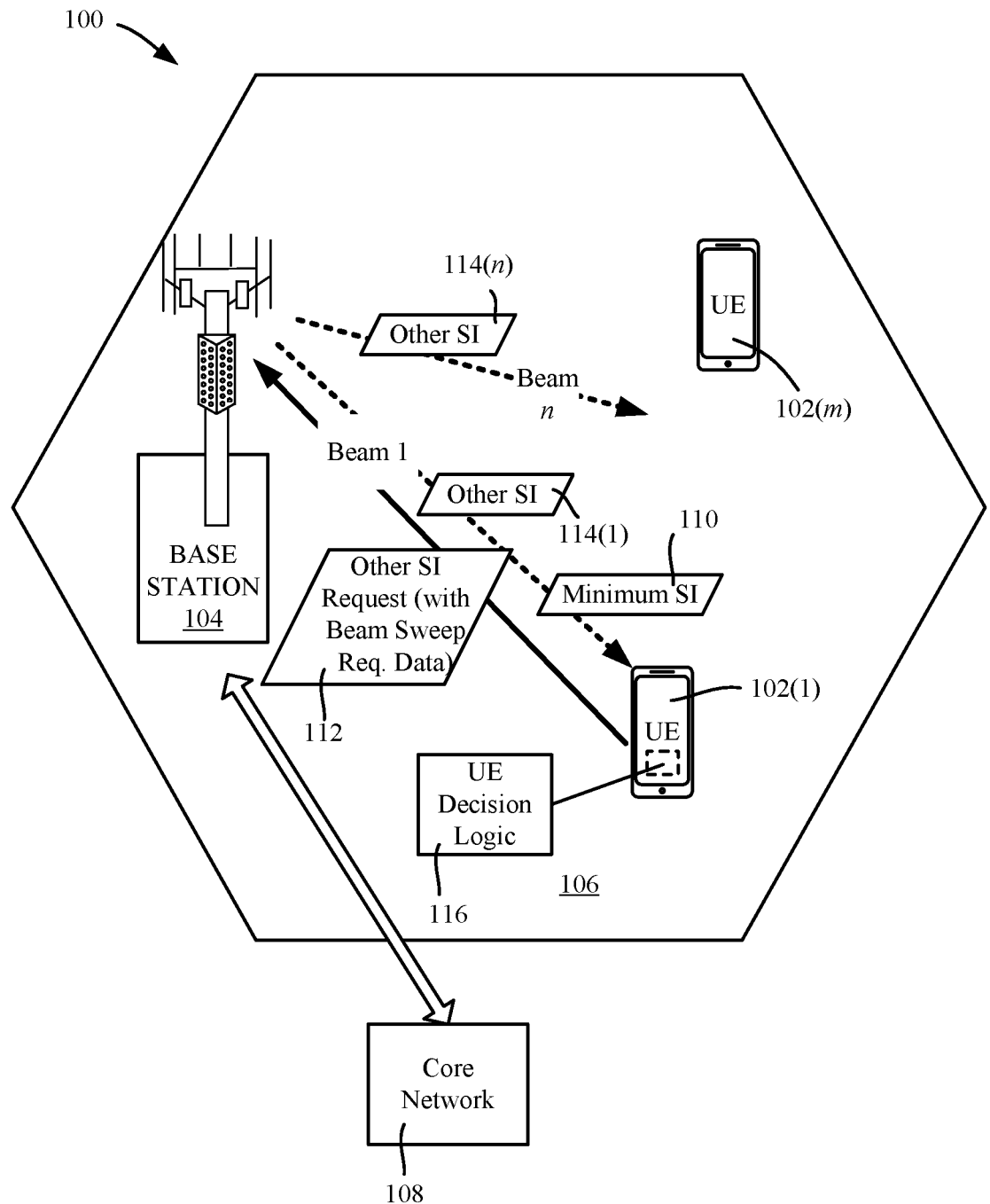
FIG. 1 is a block diagram of an example system in which user equipment can request delivery of other system information block data via one or more beams based on beam sweeping request data, in accordance with various aspects and embodiments of the subject disclosure.

The technology described herein is generally directed towards improving system usage over advanced (e.g., fifth generation networks and beyond) with respect to on-demand system information (SI) delivery to different user equipment (UEs) via one or more beams. The technology described herein is based on a UE or multiple UEs requesting from a base station, via on-demand delivery of other system information block (SIB) data (e.g., SIB2, SIB3, and so on) based on beam sweeping request data, whereby the base station can more optimally transmit the other system information block data over one or more beams in response to the request(s), e.g., vary parameters to increase a performance of transmission. This is more efficient than always sweeping transmissions via all beams, while significantly reducing the chances that the requesting device will not receive a transmission because it was sent on a beam that no longer covers the area in which a moving device was previously located.

In one implementation, via the technology described herein, a UE evaluates its current state data, such as its mobility data and which one or more beams are detected, each beam with associated signal strength data. The UE requests the other system information block data from the base station, in which the request is associated with beam sweeping request data. For example, if the UE is stationary, such as an Internet-of-Things (IoT) device fixed at a location, the UE can indicate in the request its low mobility (e.g., stationary) state, and send the request via its strongest detected beam. When the base station receives the request, the base station recognizes the stationary state, and can respond by transmitting via only the same beam. In contrast, for a fast moving mobile device, the device indicates high mobility, whereby the base station can respond by sweeping transmissions via a relatively large number of its configured beams, possibly all available configured beams. As another example, a moderately moving mobile device may indicate such state data in the beam sweeping request data, resulting in the base station selecting several beams (e.g., the original beam on which the request was received and a moderate number of adjacent beams) via which to sweep the response transmissions.

Still further, the base station can consider other UE requests received at generally the same time, and send the responses based on a combination of their beam sweeping request data. For example, two (or more) UEs may indicate their respective states in their respective requests that include the beam sweeping request data, whereby the base station can expand the selected subgroup of beams for each one to cover delivery of the other system information block data to the requesting UEs in a single subgroup sweeping operation.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution, and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system 100 comprising a number of user equipment (UEs)/mobile devices 102(1)-102(m) coupled to a base station 104 associated with a cell 106. In turn, the base station 104 is coupled to a core network 108, such as, but not limited to, mobile edge compute (MEC), self-organizing network (SON) and/or a radio access network (RAN) intelligent controller (RIC).

The minimum system information (MIB and SIB1) is periodically broadcast. This is shown in FIG. 1 via block 110.

When the base station 104 is not configured for broadcasting the other system information block (SIB) data, that is, is configured to send the other SIB data on demand, only upon receiving a system information request from a UE will the base station deliver the requested other SIB data in the system information window (in a listening/response period), in which the response can be either broadcast or unicast. The base station 104 can utilize beams to sweep over the whole-cell coverage, or as described herein, less than the entire cell. In one implementation, the base station 104 broadcasts on one beam at a time so that the cell is entirely covered after a full sweeping, although a selective, partial sweeping can occur based on the technology described herein. The UE request mechanism for on-demand delivery of the other SIB data can also be designed in different ways; when UEs request the SI (through the random access procedure), the request message can be either MSG1-based or MSG3-based.

The UE 102(1) in this example makes the other system information request, represented in FIG. 1 via block 112. As described herein, the other system information request 112 specifies beam sweep request data based on state data representative of the UE's current state in association with (e.g., as part of) the request 112.

When the base station receives the request 112, the base station responds with one or more instances of the other system information block data responses via one or more beams. In the example of FIG. 1, multiple response instances 114(1)-114(n) are transmitted via multiple beams via beam sweeping, e.g., n beams in FIG. 1. Beam sweeping refers to the technique in which a base station (e.g., the base station 104) transmits a signal (e.g., the requested SI-element data in response to a request) through several beams; the signal transmissions occur sequentially using different time and frequency slots.

For instance, when a base station (e.g., gNB) uses beam sweeping, the coverage area is divided into multiple beams, e.g., sixty-four beams in 5G implementations. In general, beamforming techniques improve signal-to-noise ratios (SNR), increase signal coverage, and improve throughput. Beamforming techniques are able to cancel out or "null" interference of other beams, which is a significant benefit in crowded environments with a high density of UEs, and multiple overlapping signal beams.

Thus, as shown in the example of FIG. 1, the UE 102(1) sends the SI-request 112 to the base station 104 through one of the beams, shown as "Beam 1" in FIG. 1. Once the base station 104 receives the SI-request, the base station 104 can broadcast the SI-Elements in response, through the same beam "Beam 1" via which the SI-request was received (a single-beam subgroup of the group of available/configured beams), or can broadcast the SI-element data through some larger subgroup, possibly comprising the entire group. If the base station 104 delivers the SI-element data through multiple beams, the base station 104 uses beam sweeping techniques.

It should be noted that when the SI-element data are delivered through several/all beams using beam sweeping techniques, the resource usage is increased, because delivering SI-element data through beam sweeping consumes more bits to cover a larger broadcast area. However, with beam sweeping, the coverage area is larger, whereby one or more UEs have increased opportunities to receive the SI-element data. Indeed, with beam sweeping, UEs in the gNB coverage area have the opportunity to receive the SI-element data even if they have not yet sent a request for the data.

As shown in FIG. 1, the user equipment 102(1) includes decision logic 116 that determines, based on current user state data (e.g., including mobility and/or signal strength data indicating whether the UE is located in an overlapping area of several beams, and possibly other data), how many beams are likely needed to receive the requested SI-element data, thereby reducing the need for again requesting via a retry procedure. The decision is based on the likelihood of using one, multiple or all beams. Data representing the decision is specified in association with the SI-element data request, that is, via the random access procedure. In general and as described herein, the higher the mobility (e.g., device speed), and/or the more beams having detected signal strength data (indicating overlapping coverage) deemed acceptable for receiving the data, the more beams requested by the UE 102(1). Thus, a fast moving UE requests some large number of beams, while a stationary UE may request only a single beam be used, e.g., the same beam on which the UE sends the request for the SI-element data. A mobile device with some mobility such as a device of a person walking or riding a bicycle may request some intermediate number of beams.

Figure 2:
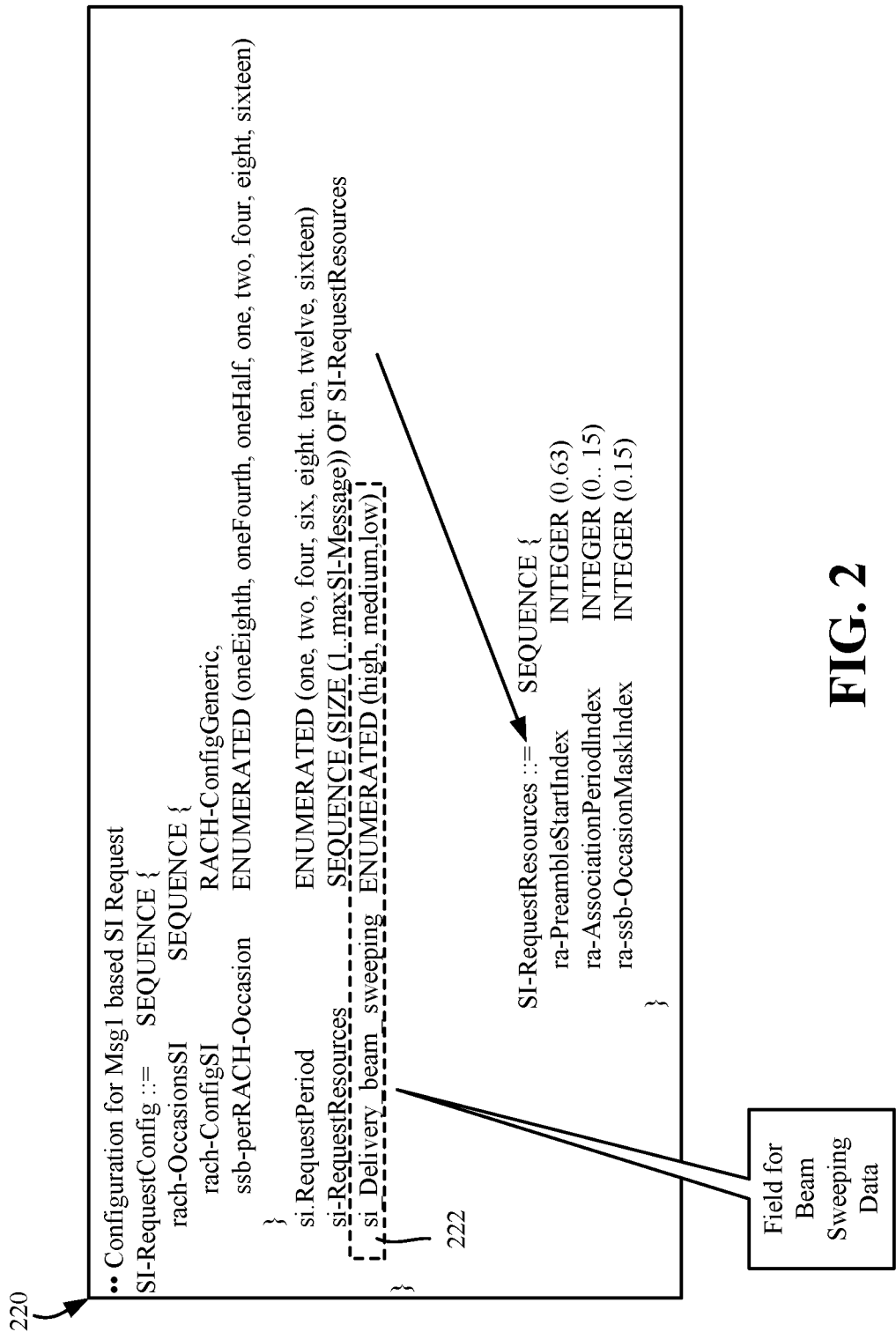
FIG. 2 is an example data structure showing a request for system information block data that includes a field by which beam sweeping request data can be specified by a user equipment, in accordance with various aspects and embodiments of the subject disclosure.

The technology described herein facilitates requesting the one or more beams. To this end, FIG. 2 shows how the UE's request message (data structure 220) for the other system information elements is communicated through the random access procedure. In the example of FIG. 2, the request message is MSG1-based.

In FIG. 2, a UE is configured to add a new, extra field in the system information request message data structure 220, (whether in the MSG1-based or MSG3-based request). This extra field includes beam sweeping request data to request one or more beams for the SI-element data transmission, based on the likelihood that the UE will correctly receive/decode the system information element(s). In the example of FIG. 2, this new field (emphasized via dashed block 222) includes the new parameter, denoted as si-Delivery_beam_sweeping (or alternatively si-Delivery_beam_sweeping required) in one implementation. Note that this is only one example, and such a field can have virtually any suitable parameter name, and/or be located in one of many possible locations in the data structure 220.

Thus, in one implementation, the decision logic 116 (FIG. 1) in the UE adds a parameter value to the extra field 222 in the system information request message. The extra field 222 contains beam-related data based on the likelihood that the UE will correctly receive/decode the delivered other SI-element data. Counterpart logic that recognizes this field and the parameter value therein can be placed at the base station, and/or a central node global control located on the core network, e.g., mobile edge compute (MEC), self-organizing network (SON) or RAN intelligent controller (RIC).

In one implementation, the parameter value in the si-Delivery_beam_sweeping field represents the likelihood that one beam, or more than one beam will be needed. The si-Delivery_beam_sweeping data can be estimated by the UE based on the UE's current state data, including mobility data and/or which beam(s) the UE has detected with sufficient signal strength to receive a transmission of a minimum system information block data broadcast.

For example, in one example implementation si-Delivery_beam_sweeping=low denotes that is very likely that the UE will receive the SI-element upon transmission by a single beam, e.g., the UE has no mobility, such as an IoT device/parking lot scenario and can detect (reasonable) signal strength of only a single beam/relatively few beams. Thus, the UE sets the parameter value to low in the request. If low, the base station may transmit on only the same beam via which the request was received, (or possibly the same beam and a couple of adjacent beams, for example).

If, instead, the UE has high mobility (e.g., is traveling in a vehicle at eighty miles-per-hour) and/or can detect reasonable signal strength of relatively many beams, in this example implementation the UE sets si-Delivery_beam_sweeping=high for the parameter value in the si-Delivery_beam_sweeping field. If high, the base station may transmit on the same beam via which the request was received, and sweep through a relatively large number of adjacent beams, possibly all beams, for example.

A si-Delivery_beam_sweeping=medium for the parameter value in the si-Delivery_beam_sweeping field indicates some device mobility, e.g., not relatively fast (e.g., a UE of a person walking) and/or can detect reasonable signal strength of some beams. If medium, the base station generally will transmit on the same beam via which the request was received, and sweep through at least two (e.g., several) adjacent beams, for example.

Instead of (or in addition) to low, medium and high values, the parameter value(s) can be more granular/explicit with respect to current user device state data. For example, the si-Delivery_beam_sweeping field(s) can be used to represent velocity data, e.g., most recent speed and direction of the device. Because the base station knows from which beam the other SI data request was received, the base station can use the velocity data to determine the most likely locations of the UE at the time of sending the response, and map the location data to select which subgroup of beam(s) to use for the response transmission timeframe. Note that a single integer value can represent speed and direction for example, e.g. a hashed (not necessarily linear) speed value within the range of 0 to 7 can represent the speed in a northerly direction, a hashed speed value within the range of 8 to 15 can represent the speed in a northeasterly direction, and so on up to northwesterly movement. Coordinates and timing data alternatively can be sent to represent the velocity data (rather than sending the speed and direction data); e.g., at time t1, the UE was at coordinates x1, y1, z1 and at time t2 the UE was at coordinates x2, y2, z2, which can be conveyed in association with the other SI block data request. Other conventions understood by both UEs and network equipment are feasible to use. In any event, instead of high, medium, low designations or the like (e.g., high, medium high, medium, medium low and low), numeric or other data can be used represent the UE state as requested in the si Delivery_beam_sweeping field or similar field(s).

Figure 3:
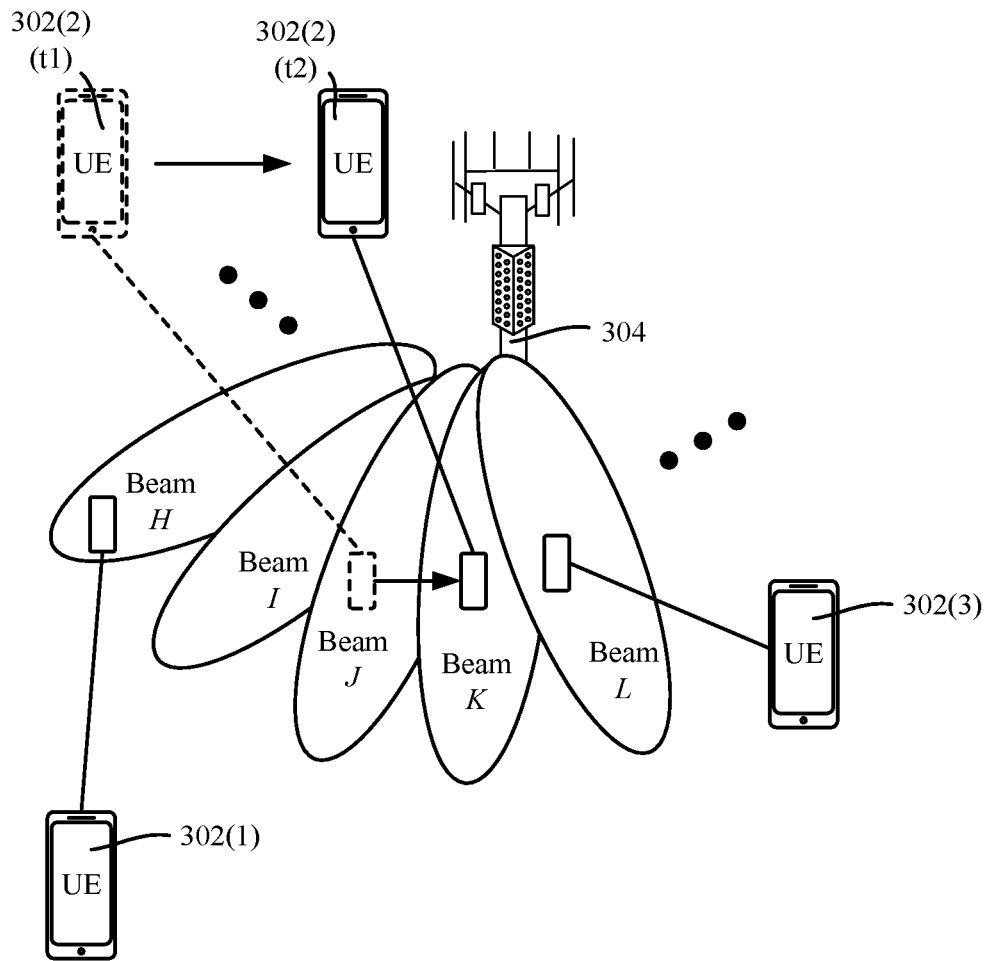
FIG. 3 is a block diagram of an example base station and beams by which user equipment receive delivery of other system information block data via one or more beams based on beam sweeping request data, in accordance with various aspects and embodiments of the subject disclosure.

Turning to another aspect, the base station can combine beam sweeping-related SI request information received from multiple devices. FIG. 3 shows an example of three UEs 302(1)-302(3). The UE 302(2) is shown as moving from time (t1) to time (t2), labeled as 302(2) (t1) and 302(2) (t2). In this example, the UEs 302(1)-302(3) send requests for the element data at generally the same time, from within the coverage areas represented by beams H, J and L, respectively.

In this example, consider that the beam sweeping request data of the UEs 302(1) and 302(3) both indicate low (or some similar numeric data representation(s) corresponding to low), while the beam sweeping request data of the UE 302(2) indicates medium or the like. Instead of selecting beam H for the UE 302(1) and beam L for the UE 102(3), and some other predicted beam(s) for the UE 302(2) the base station 304 can determine that a beam sweep transmission operation through the beams H-L, and possibly others, will likely be a more optimal way to return the SI element data response instances to the three UEs 302(1)-302(3). This may also result in other UE devices that have not yet made their SI element data requests benefitting from the beam sweeping transmissions. As is understood, FIG. 3 is only one example, and a beam sweep through (up to) the entire group of available/configured beams can be used if deemed by the network equipment to be likely more efficient.

Figure 4:
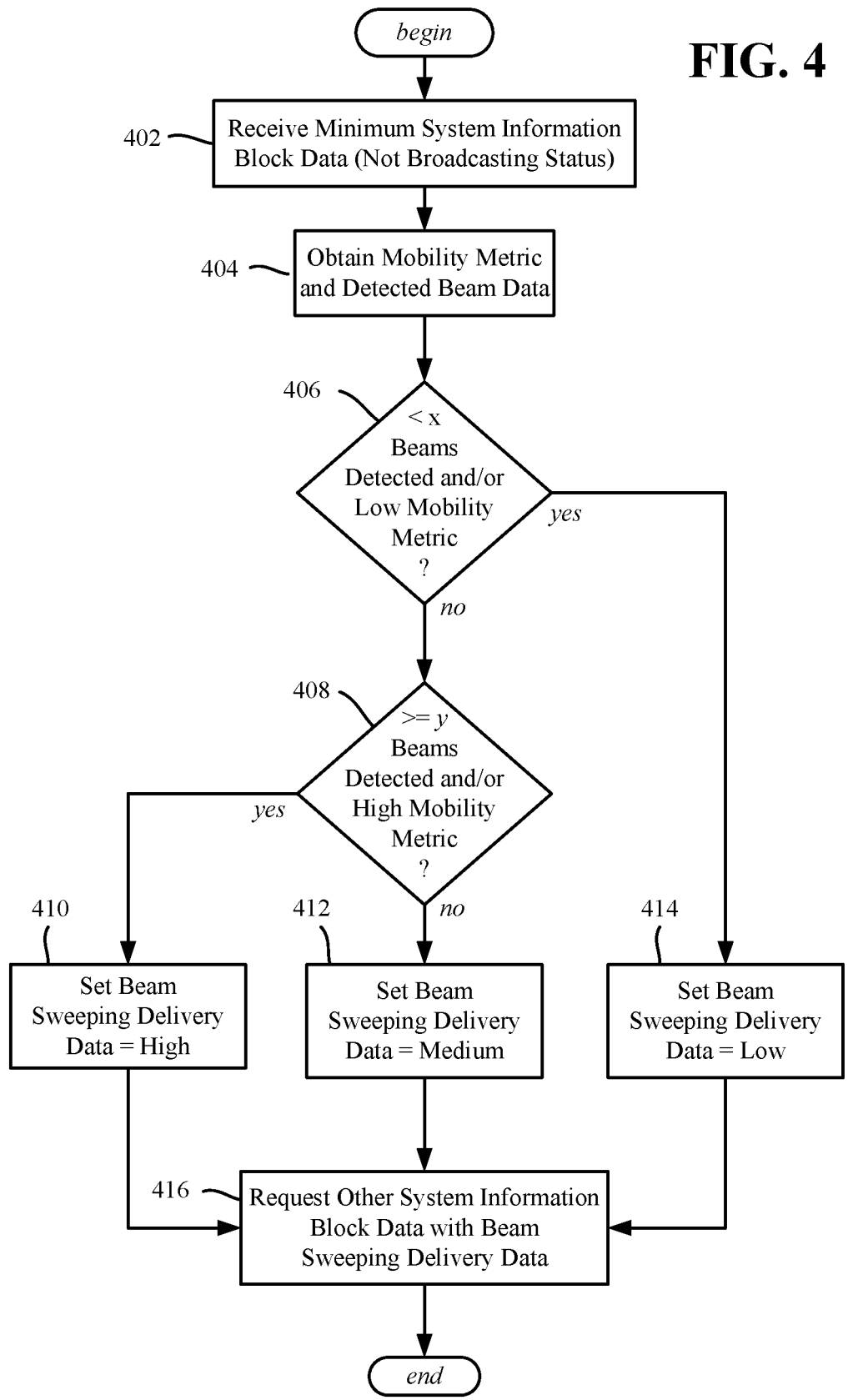
FIG. 4 is a flow diagram representing example operations related to a user equipment requesting other system information block data via one or more beams based on beam sweeping request data, in accordance with various aspects and embodiments of the subject disclosure.

FIG. 4 is a flow diagram showing example operations that can be performed by UEs, beginning at operation 402 which represents receiving the minimum system information block data. Note that in this example, the minimum system information block data indicates that the base station is operating on demand, that is, the UE logic recognizes that the base station not broadcasting the other system information block data unless explicitly requested by a UE.

Figure 5:
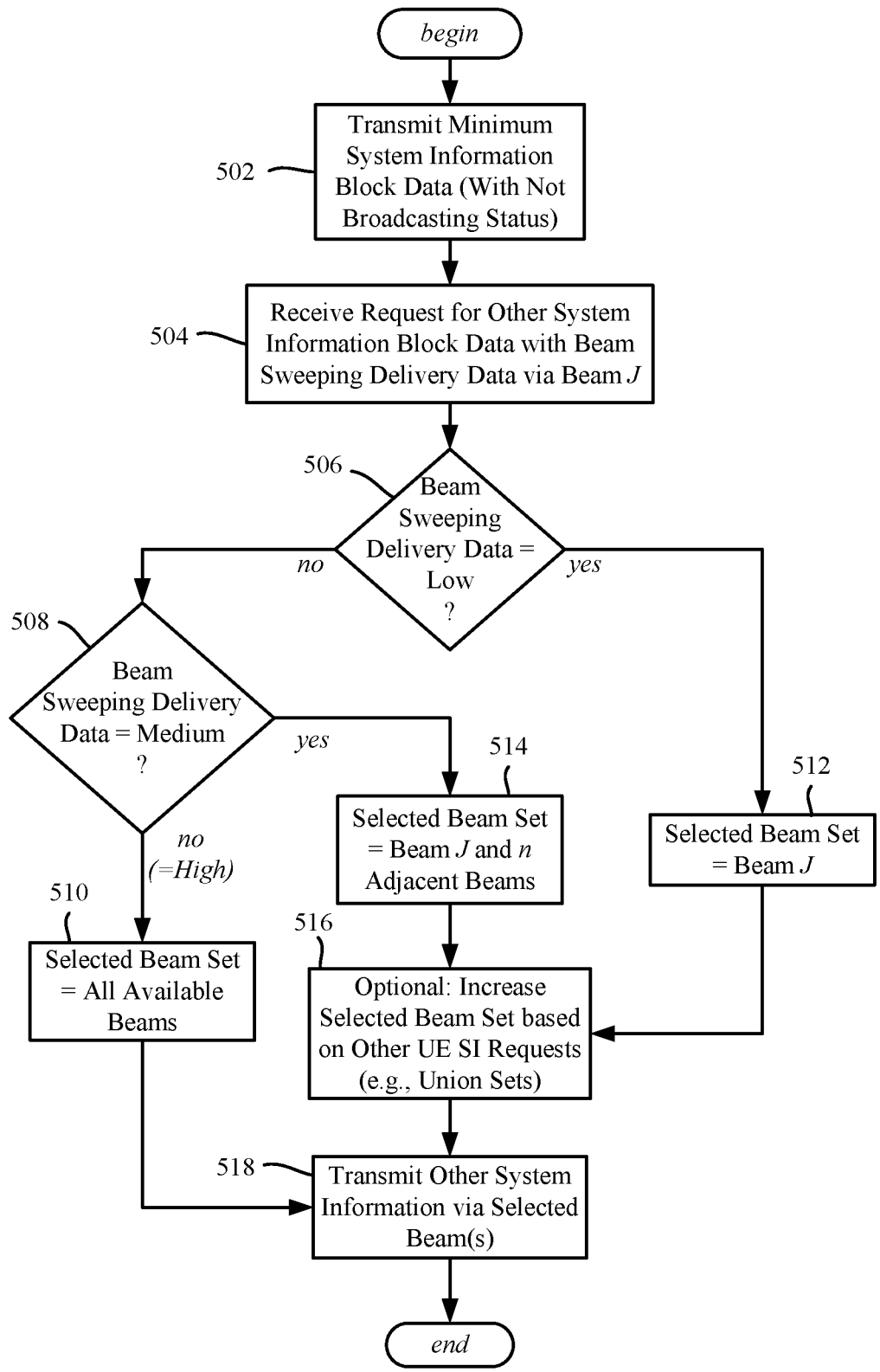
FIG. 5 is a flow diagram representing example operations related to a base station handling a request from a user equipment for responding with other system information block data via one or more beams, in accordance with various aspects and embodiments of the subject disclosure.

As represented by operation 404, the UE obtains a mobility metric, which can be current speed, velocity or some data representative thereof, e.g., mapped to high, medium or low speed in this example. In the examples of FIGS. 4 and 5, high, medium or low values are used as one example, however as is understood other (e.g., numerical) data can be sent as part of the beam sweeping request data.

If the number of detected beams (e.g., greater than some signal strength threshold) is below some value, represented in FIG. 4 as x, and/or the mobility metric is low (e.g., including stationary), then operation 414 sets the beam sweeping request data to low, e.g., in the si Delivery_beam_ sweeping parameter value. If, instead, the number of detected beams (e.g., greater than some signal strength threshold) is above some value, represented in FIG. 4 as y, and/or the mobility metric is high, then operation 410 sets the beam sweeping request data to high, e.g., in the si Delivery_beam_sweeping parameter value. Otherwise operation 412 sets the beam sweeping request data to medium.

Operation 416 sends the request for the other system information block data in association with the beam sweeping request data to the base station, e.g., including via the data structure 220 of FIG. 2. Although not explicitly shown in FIG. 4, it is understood that the UE either receives the minimum system information block data or retries the request.

FIG. 5 is a flow diagram showing example operations that can be performed by network equipment, e.g., a base station, beginning at operation 502 which represents transmitting the transmit minimum system information block data (with not broadcasting status). Operation 504 represents receiving the request from a UE for the other system information block data via a beam identified as beam J in this example.

Operation 506 evaluates the si Delivery_beam_sweeping data field as described herein. If set to low, then operation 512 selects, as the beam set/subgroup, the beam J.

If not low, operation 508 evaluates whether the si Delivery_beam_sweeping data field is set to medium. If set to medium, then operation 514 selects, as the beam set/subgroup, the beam J and some number n of adjacent beams. Note that if velocity data is instead available, the adjacent beams can, for example, be used to determine the value of n, possibly also including the beam of the coverage area before the beam J, e.g., beam I in FIG. 3, (in case the UE is close to the beam I coverage area and reverses direction, e.g., a person walking turns around).

Operation 516 represents optionally increasing the selected beam set's members based on request(s) from other UE(s). For example, the same logic of operations 504-512 can be performed for each other UE to determine each UE's set(s), with the union of sets resulting in a final subgroup of beams.

Returning to operations 506 and 508, the si Delivery_beam_sweeping data field is neither set to low nor medium, in this example the value is set to high, and operation 510 selects all available beams. Note that once all beams are selected, there is no need to combine pending requests from different UEs, and indeed, if all beams are selected for any "high" data field value from any UE of multiple UEs, then there is no need to even determine the beam sets for the other UEs.

Operation 518 transmits the other system information based on the selected beam set, which can be by a single beam or by sweeping through multiple beams.

Figure 6:
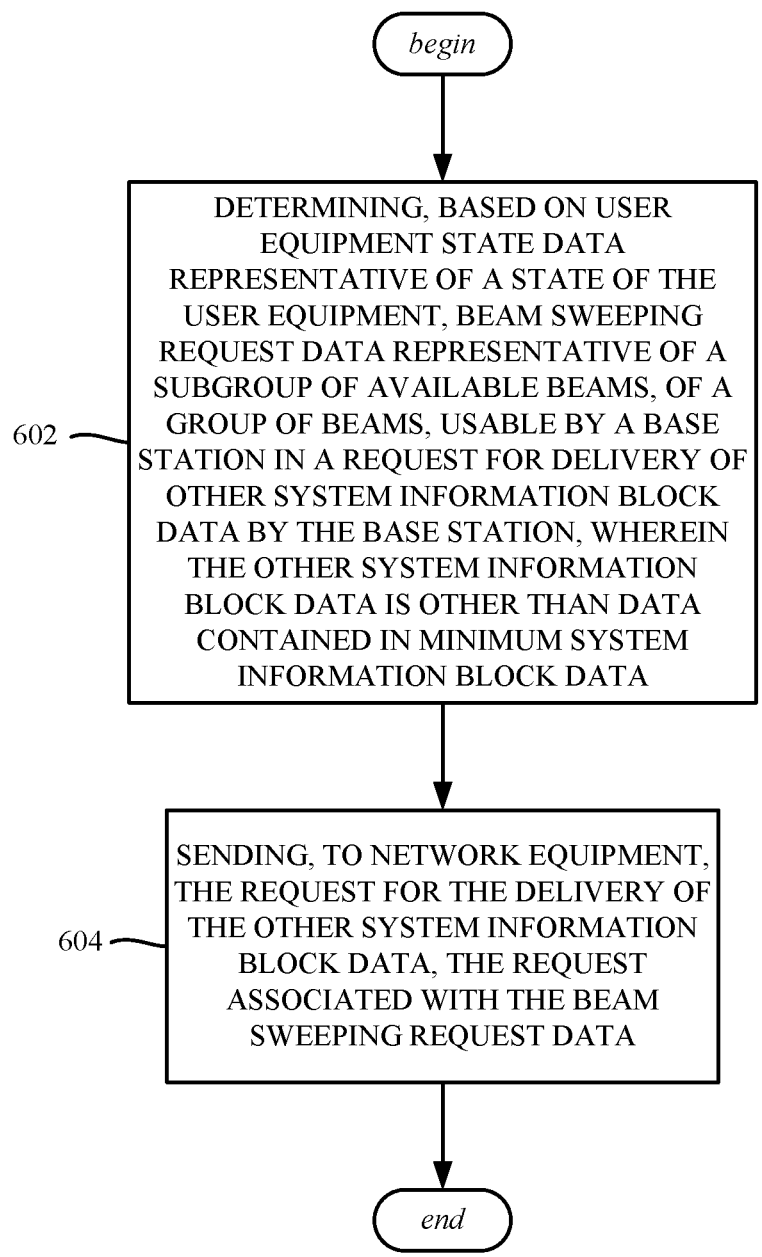
FIG. 6 is a flow diagram representing example operations related to a user equipment determining beam sweeping request data with respect to requesting other system information block data transmission(s) from network equipment, in accordance with various aspects and embodiments of the subject disclosure.

One or more example aspects are represented in FIG. 6, and can correspond to a UE, including a processor, and a memory that stores executable instructions that, when executed by the processor, facilitate performance of operations. Example operation 602 represents determining, based on UE state data representative of a state of the UE, beam sweeping request data representative of a subgroup of available beams, of a group of beams, usable by a base station in a request for delivery of other system information block data by the base station, wherein the other system information block data is other than data contained in minimum system information block data. Example operation 604 represents sending, to network equipment, the request for the delivery of the other system information block data, the request associated with the beam sweeping request data.

The UE state data can be determined based on mobility data corresponding to a mobility of the UE.

The UE state data can be determined based on respective signal strength data of respective beams detected by the UE.

The UE state data can include mobility data corresponding to a mobility of the UE and respective signal strength data of at least one respective beam detected by the UE, and the determining the beam sweeping request data can be based on at least one of the mobility data or the respective signal strength data.

The mobility data can include an indication of no current mobility by the UE, and determining the beam sweeping request data can include selecting a low beam sweeping request data parameter value relative to other available beam sweeping request data parameter values that are higher than the low beam sweeping request data parameter value.

The mobility data can include an indication of some current mobility by the UE that is less than a threshold high mobility level, the respective signal strength data can include the respective signal strength data of at least two respective beams detected by the UE, the determining of the beam sweeping request data can include selecting a medium beam sweeping request data parameter value relative to other available beam sweeping request data parameter values that are either high beam sweeping request data parameter values greater than the medium beam sweeping request data parameter value or low beam sweeping request data parameter values lower than the medium beam sweeping request data parameter value; the high beam sweeping request data parameter values can be applicable to high mobility by the UE that is at least the threshold high mobility, and the low beam sweeping request data parameter values can be applicable to no mobility by the UE.

The mobility data can include a current mobility that satisfies at least a high threshold mobility level, the respective signal strength data can include signal strength data of at least two respective beams detected by the UE, and determining the beam sweeping request data can include selecting a high beam sweeping request data parameter value relative to other available beam sweeping request data parameter values that are lower than the high beam sweeping request data parameter value.

The request for the delivery of the other system information block data can include the beam sweeping request data to result in the beam sweeping request data being associated with the request at the network equipment.

The beam sweeping request data can represent velocity data representative of a velocity of the UE.

The UE state data can include mobility data corresponding to a mobility of the UE and respective signal strength data of at least one respective beam detected by the UE, and further can include applying a mathematical function to combine the mobility data and the respective signal strength data into numerical data representative of a numerical value, and using the numerical data as the beam sweeping request data.

Figure 7:
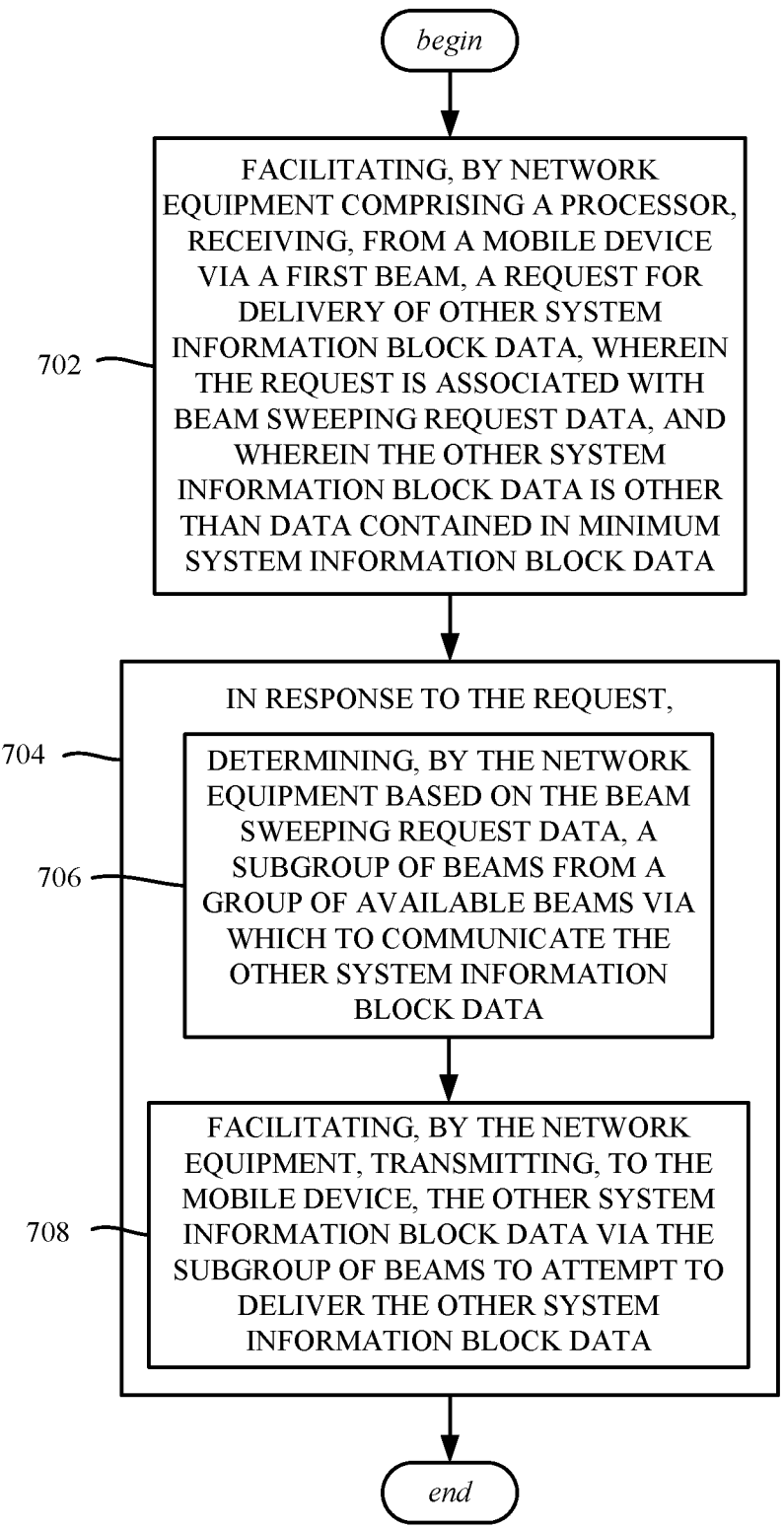
FIG. 7 is a flow diagram representing example operations related to network equipment determining a subgroup of beams via which other system information block data is communicated based on beam sweeping request data received from a user equipment, in accordance with various aspects and embodiments of the subject disclosure.

One or more example aspects are represented in FIG. 7, and, for example, can correspond to operations, such as of a method. Example operation 702 represents facilitating, by network equipment comprising a processor, receiving, from a mobile device via a first beam, a request for delivery of other system information block data, wherein the request is associated with beam sweeping request data, and wherein the other system information block data is other than data contained in minimum system information block data. Example operation 704 represents, in response to the request, determining, by the network equipment based on the beam sweeping request data, a subgroup of beams from a group of available beams via which to communicate the other system information block data (example operation 706), and facilitating, by the network equipment, transmitting, to the mobile device, the other system information block data via the subgroup of beams to attempt to deliver the other system information block data (example operation 708).

The network equipment can utilize a plurality of energy beams, which radiate in different directions, to logically communicate with the user equipment via an over the air interface, and the network equipment can be capable of using beam sweeping techniques to deliver the other system information block to the user equipment in a sequential manner by using different time and frequency slots.

Determining the subgroup of beams can include selecting only one beam of the group of the available beams as the subgroup.

Determining the subgroup of beams can include selecting, as the subgroup, a first beam and at least one second beam adjacent to the first beam.

Determining the subgroup of beams can include of the subgroup of beams comprises selecting all of the group of the available beams as the subgroup.

The beam sweeping request data can represent velocity data of the mobile device, and determining the subgroup of beams can include estimating, based on the beam sweeping request data, a future possible location of the mobile device at an upcoming delivery attempt timeframe applicable to the transmitting.

The request can be a first request, the mobile device can be a first mobile device, the beam sweeping request data can include first beam sweeping request data applicable to a first beam of the subgroup of beams, and further operations can include facilitating, by the network equipment, receiving, from a second mobile device via a second beam of the subgroup of beams, a second request for the delivery of the other system information block data, in which the second request can be associated with second beam sweeping request data applicable to the second beam, the determining of the subgroup of beams can include processing, by the network equipment, the first beam sweeping request data in conjunction with the second beam sweeping request data, and transmitting the other system information block data can include transmitting by sweeping through the subgroup of beams in a sequential manner by using different time and frequency slots.

Figure 8:
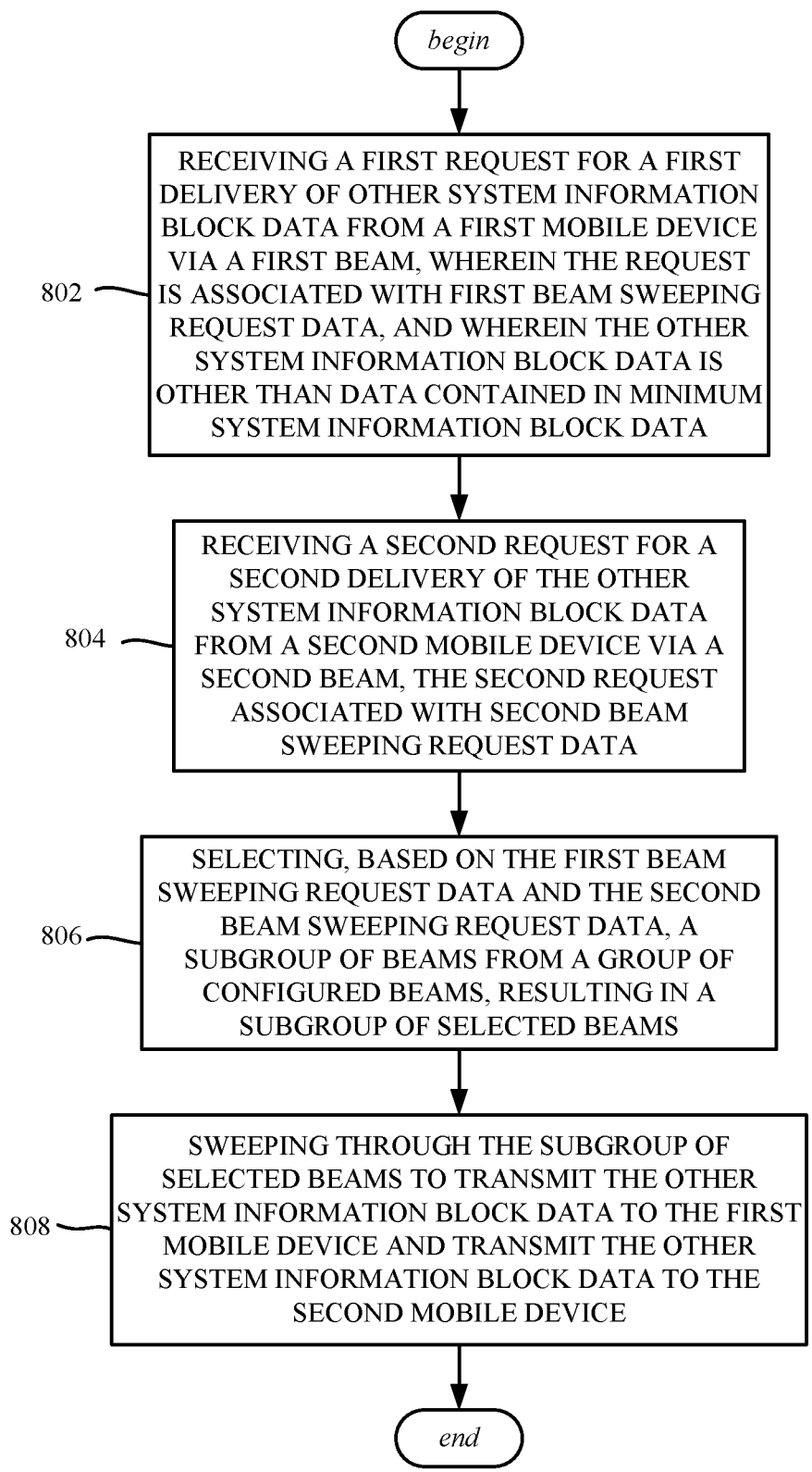
FIG. 8 is a flow diagram representing example operations related to sweeping through a subgroup of selected beams to transmit other system information block data to mobile devices based on beam sweeping request data, in accordance with various aspects and embodiments of the subject disclosure.

One or more aspects are represented in FIG. 8, such as implemented in a machine-readable medium, including executable instructions that, when executed by a processor of network equipment, facilitate performance of operations. Example operation 802 represents receiving a first request for a first delivery of other system information block data from a first mobile device via a first beam, wherein the request is associated with first beam sweeping request data, and wherein the other system information block data is other than data contained in minimum system information block data. Example operation 804 represents receiving a second request for a second delivery of the other system information block data from a second mobile device via a second beam, the second request associated with second beam sweeping request data. Example operation 806 represents selecting, based on the first beam sweeping request data and the second beam sweeping request data, a subgroup of beams from a group of configured beams, resulting in a subgroup of selected beams. Example operation 808 represents sweeping through the subgroup of selected beams to transmit the other system information block data to the first mobile device and transmit the other system information block data to the second mobile device.

Selecting the subgroup of beams can include evaluating mobility data of the first mobile device as comprised in the first beam sweeping request data. Selecting the subgroup of beams can include evaluating at least one of: first mobility data of the first mobile device as included in the first beam sweeping request data, or evaluating second mobility data of the second mobile device as comprised in the second beam sweeping request data.

The first beam sweeping request data can represent velocity data representative of a velocity of the first mobile device, and selecting the subgroup of selected beams can include estimating, based on the velocity data, a potential future location of the first mobile device at a corresponding future delivery timeframe to determine at least part of the subgroup of selected beams.

As can be seen, the technology described herein facilitates more optimal UE and network resource usage by providing a way for a UE to specify one or more beams for transmission of system information block data. Battery consumption can be reduced on the UE by avoiding retry requests, while signaling overhead is reduced on the network by selectively sweeping through beams.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different subbands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 9:
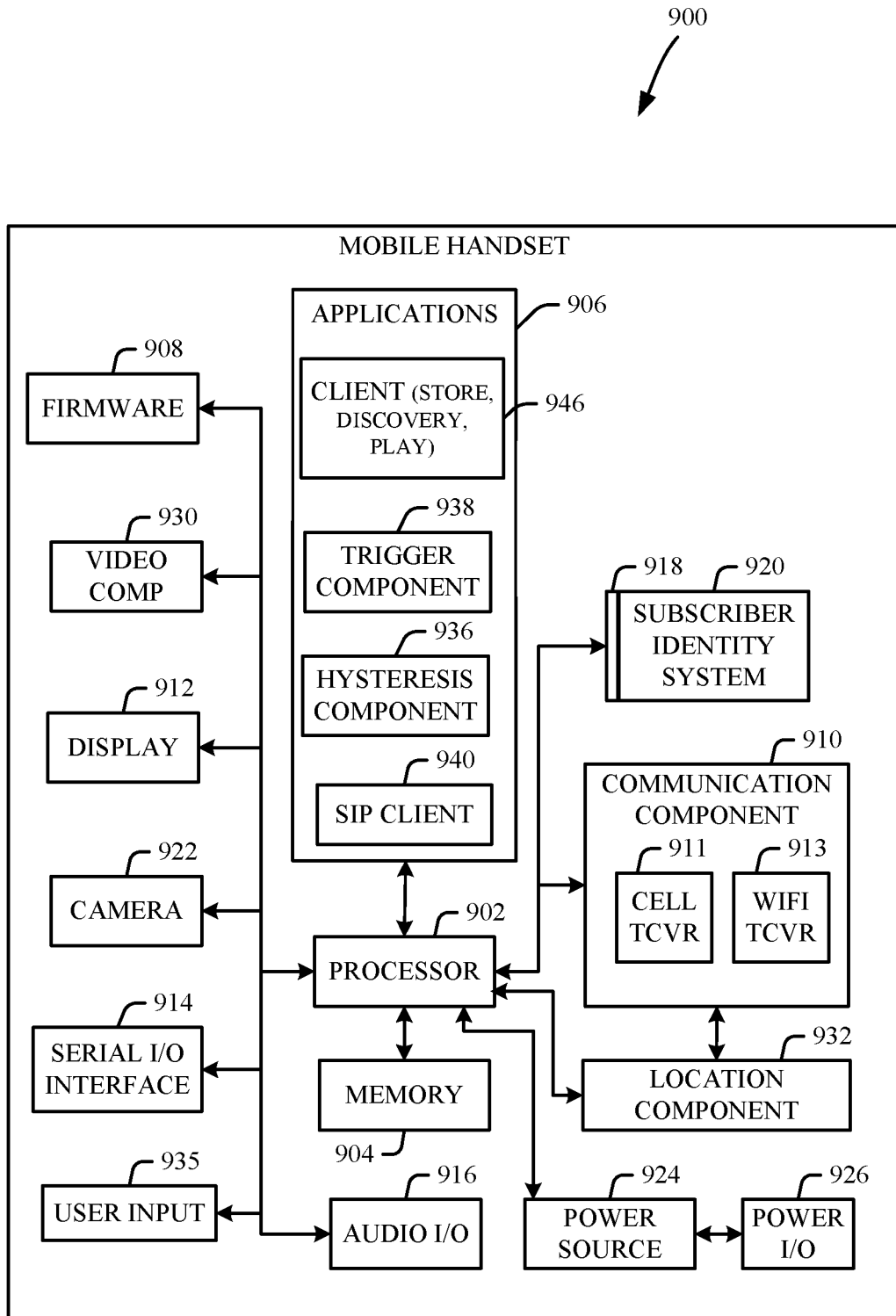
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as UE) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
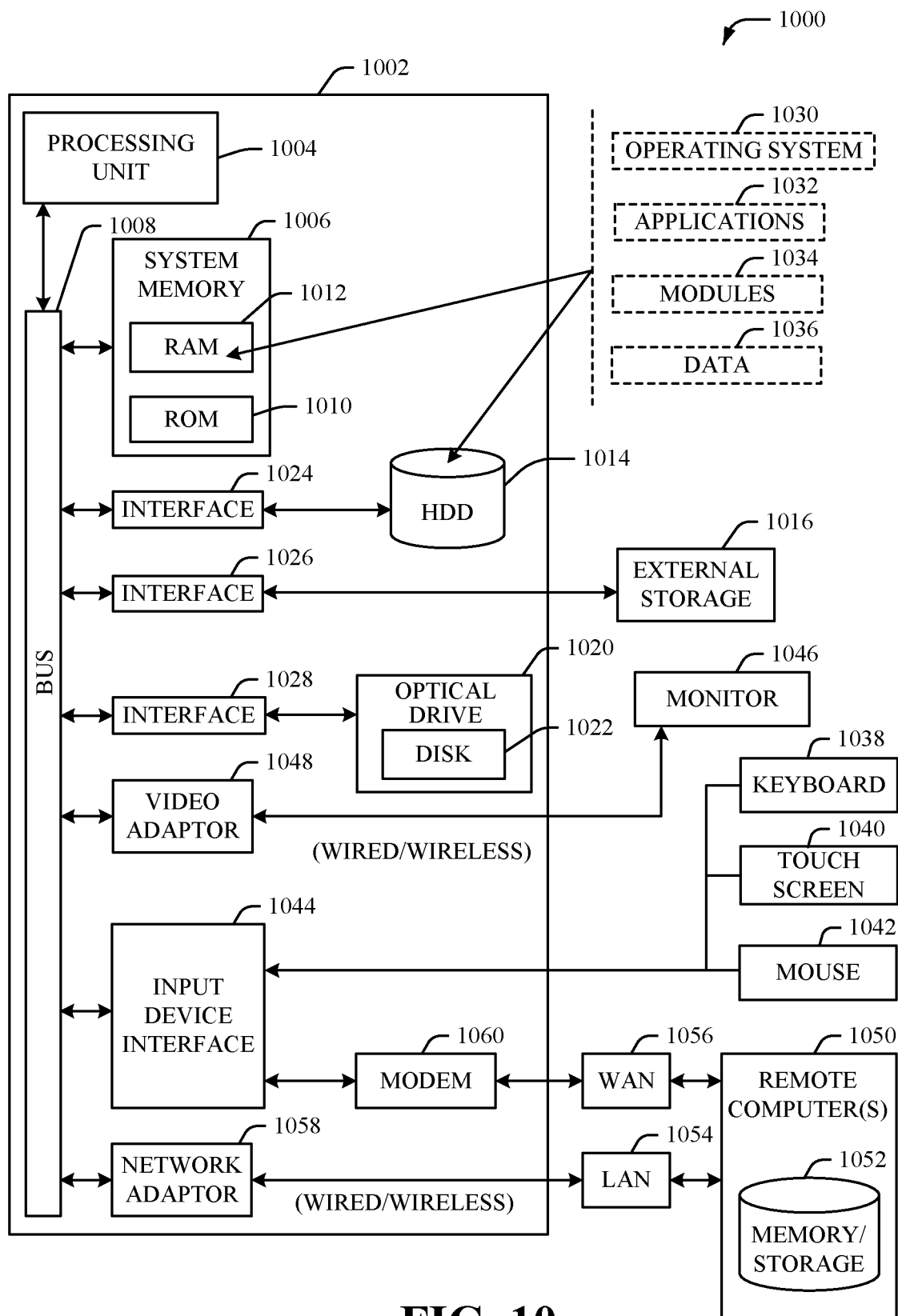
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UEs. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A user equipment, comprising:
   a processor; and
   a memory that stores executable instructions that, when executed by the processor, facilitate performance of operations, the operations comprising:
      determining, based on user equipment state data representative of a state of the user equipment, beam sweeping request data representative of a subgroup of available beams, of a group of beams, usable by a base station in a request for delivery of other system information block data by the base station, wherein the other system information block data is other than data contained in minimum system information block data, wherein the user equipment state data includes mobility data corresponding to a mobility of the user equipment and respective signal strength data of at least one respective beam detected by the user equipment, wherein the beam sweeping request data is determined based on a mathematical function utilizing the mobility data and the respective signal strength data; and
      sending, to network equipment, the request for the delivery of the other system information block data, the request associated with the beam sweeping request data.

2. The system of claim 1, wherein the user equipment state data is determined based on mobility data corresponding to a mobility of the user equipment.

3. The system of claim 1, wherein the user equipment state data is determined based on respective signal strength data of respective beams detected by the user equipment.

4. The system of claim 1, wherein the determining of the beam sweeping request data further comprises applying a weighting factor to prioritize either the mobility data or the respective signal strength data based on a predefined threshold.

5. The system of claim 4, wherein the mobility data comprises an indication of no current mobility by the user equipment, and wherein the determining of the beam sweeping request data comprises selecting a low beam sweeping request data parameter value relative to other available beam sweeping request data parameter values that are higher than the low beam sweeping request data parameter value.

6. The system of claim 4, wherein the mobility data comprises an indication of some current mobility by the user equipment that is less than a threshold high mobility level, wherein the respective signal strength data comprises the respective signal strength data of at least two respective beams detected by the user equipment, wherein the determining of the beam sweeping request data comprises selecting a medium beam sweeping request data parameter value relative to other available beam sweeping request data parameter values that are either high beam sweeping request data parameter values greater than the medium beam sweeping request data parameter value or low beam sweeping request data parameter values lower than the medium beam sweeping request data parameter value, wherein the high beam sweeping request data parameter values are applicable to high mobility by the user equipment that is at least the threshold high mobility, and wherein the low beam sweeping request data parameter values are applicable to no mobility by the user equipment.

7. The system of claim 4, wherein the mobility data comprises a current mobility that satisfies at least a high threshold mobility level, wherein the respective signal strength data comprises signal strength data of at least two respective beams detected by the user equipment, and wherein the determining of the beam sweeping request data comprises selecting a high beam sweeping request data parameter value relative to other available beam sweeping request data parameter values that are lower than the high beam sweeping request data parameter value.

8. The system of claim 1, wherein the request for the delivery of the other system information block data comprises the beam sweeping request data to result in the beam sweeping request data being associated with the request at the network equipment.

9. The system of claim 1, wherein the beam sweeping request data represents velocity data representative of a velocity of the user equipment.

10. The system of claim 1, wherein the mathematical function is based on a combination of the mobility data and the respective signal strength data into numerical data representative of a numerical value, and using the numerical data as the beam sweeping request data.

11. A method, comprising:
   facilitating, by network equipment comprising a processor, receiving, from a mobile device via a first beam, a request for delivery of other system information block data, wherein the request is associated with beam sweeping request data, and wherein the other system information block data is other than data contained in minimum system information block data, wherein the beam sweeping request data is determined based on a mathematical function utilizing mobility data and signal strength data; and
   in response to the request,
      determining, by the network equipment based on the beam sweeping request data, a subgroup of beams from a group of available beams via which to communicate the other system information block data, and
      facilitating, by the network equipment, transmitting, to the mobile device, the other system information block data via the subgroup of beams to attempt to deliver the other system information block data.

12. The method of claim 11, wherein the network equipment utilizes a plurality of energy beams, which radiate in different directions, to logically communicate with the mobile device via an over the air interface, the network equipment capable of using beam sweeping techniques to deliver the other system information block to the mobile device in a sequential manner by using different time and frequency slots.

13. The method of claim 11, wherein the determining of the subgroup of beams comprises selecting only one beam of the group of the available beams as the subgroup.

14. The method of claim 11, wherein the determining of the subgroup of beams comprises selecting, as the subgroup, a first beam and at least one second beam adjacent to the first beam.

15. The method of claim 11, wherein the determining of the subgroup of beams comprises selecting all of the group of the available beams as the subgroup.

16. The method of claim 11, wherein the beam sweeping request data represents velocity data of the mobile device, and wherein the determining of the subgroup of beams comprises estimating, based on the beam sweeping request data, a future possible location of the mobile device at an upcoming delivery attempt timeframe applicable to the transmitting.

17. The method of claim 11, wherein the request is a first request, wherein the mobile device is a first mobile device, wherein the beam sweeping request data comprises first beam sweeping request data applicable to a first beam of the subgroup of beams, wherein the method further comprises facilitating, by the network equipment, receiving, from a second mobile device via a second beam of the subgroup of beams, a second request for the delivery of the other system information block data, wherein the second request is associated with second beam sweeping request data applicable to the second beam, wherein the determining of the subgroup of beams comprises processing, by the network equipment, the first beam sweeping request data in conjunction with the second beam sweeping request data, and wherein the transmitting of the other system information block data comprises transmitting by sweeping through the subgroup of beams in a sequential manner by using different time and frequency slots.

18. A non-transitory machine-readable medium, comprising executable instructions that, when executed by a processor of network equipment, facilitate performance of operations, the operations comprising:
receiving a first request for a first delivery of other system information block data from a first mobile device via a first beam, wherein the request is associated with first beam sweeping request data, and wherein the other system information block data is other than data contained in minimum system information block data, wherein the first beam sweeping request data is determined based on a mathematical function utilizing first mobility data corresponding to a mobility of the first mobile device and signal strength data of the first beam detected by the first mobile device;
receiving a second request for a second delivery of the other system information block data from a second mobile device via a second beam, the second request associated with second beam sweeping request data, wherein second beam sweeping request data is determined based on a mathematical function utilizing second mobility data corresponding to a mobility of the second mobile device and signal strength data of the second beam detected by the second mobile device;
selecting, based on the first beam sweeping request data and the second beam sweeping request data, a subgroup of beams from a group of configured beams, resulting in a subgroup of selected beams; and
sweeping through the subgroup of selected beams to transmit the other system information block data to the first mobile device and transmit the other system information block data to the second mobile device.

19. The non-transitory machine-readable medium of claim 18, wherein the selecting of the subgroup of beams comprises evaluating at least one of: first mobility data of the first mobile device as comprised in the first beam sweeping request data, or evaluating second mobility data of the second mobile device as comprised in the second beam sweeping request data.

20. The non-transitory machine-readable medium of claim 18, wherein the first beam sweeping request data represents velocity data representative of a velocity of the first mobile device, and wherein the selecting of the subgroup of selected beams comprises estimating, based on the velocity data, a potential future location of the first mobile device at a corresponding future delivery timeframe to determine at least part of the subgroup of selected beams.

* * * * *